United States Patent [19]

Toupin et al.

[11] Patent Number: 4,999,615

[45] Date of Patent: Mar. 12, 1991

[54] DEVICE FOR DETECTING THE EXCEEDING OF A TEMPERATURE THRESHOLD

[76] Inventors: Joseph F. Toupin, 28 rue du Pré72300 Sable sur Sarthe; Xavier Douesnel, 10/16 rue Pierre Guérin, 75016 Paris, both of France

[21] Appl. No.: 503,738

[22] Filed: Apr. 3, 1990

[30] Foreign Application Priority Data

Apr. 3, 1989 [FR] France ................. 89 04374

[51] Int. Cl.⁵ ............... G08B 17/02; G01D 5/12
[52] U.S. Cl. ....................... 340/590; 116/204; 116/217; 340/585
[58] Field of Search ............ 340/590, 592, 585; 73/745; 200/82 R, 82 E; 116/204, 207, 216–217; 374/160; 62/125–131

[56] References Cited

U.S. PATENT DOCUMENTS

| | | | |
|---|---|---|---|
| 3,611,220 | 10/1971 | Hoffman | 200/82 E X |
| 4,058,014 | 11/1977 | Durand | 340/590 X |
| 4,144,532 | 3/1979 | Boyd | 340/585 |
| 4,325,059 | 4/1982 | Jaye | 340/585 |
| 4,501,124 | 2/1985 | Shone et al. | 62/129 |
| 4,649,854 | 3/1987 | Janke et al. | 116/216 |
| 4,812,826 | 3/1989 | Kaufman et al. | 340/592 X |
| 4,876,531 | 10/1989 | Dondorf | 73/745 X |

FOREIGN PATENT DOCUMENTS

| | | |
|---|---|---|
| 8707373 | 12/1987 | PCT Int'l Appl. . |
| 1229788 | 5/1986 | U.S.S.R. ............. 340/590 |
| 1159437 | 7/1969 | United Kingdom . |

OTHER PUBLICATIONS

"Meltdown Alarm", CQ Radio, vol. 35, No. 3, Mar. 1979.
Engineering, vol. 226, No. 9, Sep. 1986, p. 595, London, GB.

Primary Examiner—Glen R. Swann, III
Assistant Examiner—Thomas J. Mullen, Jr.
Attorney, Agent, or Firm—Michael N. Meller

[57] ABSTRACT

Device for detecting the exceeding of a temperature threshold incorporating a first mobile part (5) in a sealed chamber (4) containing a material melting at the temperature of the threshold and a second mobile part (8) outside the chamber. In the armed position, the two parts exert forces on one another tending to move them apart, but the first part is blocked by the solidified material and the second is immobilized by the combination of shapes (12, 13) in case (9). The melting of the material frees the first part, whose displacement frees the second part, which then operates an alarm system (18). This displacement leads to the return of the first part to the initial position, which permits rearming when the material has resolidified.

20 Claims, 4 Drawing Sheets

DEVICE FOR DETECTING THE EXCEEDING OF A TEMPERATURE THRESHOLD

The present invention relates to a process for detecting the exceeding of a temperature threshold to which a solid, liquid or gas may be exposed.

BACKGROUND OF THE INVENTION

There are numerous means for detecting the clearing or exceeding of a temperature threshold. Thus, systems are known, whose operating principle is based on the expansion of a solid, liquid or gas which, as a function of the temperature to which it is exposed, has variable volume or dimensional characteristics.

There are other systems, whose operating principle is based on the property of certain metal alloys which, formed at a given temperature and then subject to a different temperature, can only reassume their initial shape when again exposed to the temperature at which they were formed. This physical phenomenon is known under the name "shape memory materials".

There are also detectors of the exceeding of a temperature threshold generally in the form of pellets or small rods, whose colour changes on exceeding the temperature for which they were set, the cause of said colour variation being either an enzymatic reaction, or the melting of a "solid-liquid" phase change material, which in the liquid phase displaces by capillarity within a support comparable to blotting paper.

Finally, FR-A-2599144 in the name of the present Applicants, another means or system, which is known as the "cold chain break detector" is known, whose operating principle jointly uses the property of phase change materials and the application of a purely magnetic force to a coloured mobile member within a partly transparent tube. The displacement of the coloured mobile member is only possible when the melting of the phase change material releases said member and, by displacement, enables it to appear in front of a transparent window of the tube through which it becomes visible.

Detectors of the exceeding of a temperature threshold in the form of pellets or small rods only give an optical indication and can only fulfil said function, reference only being made thereto for information purposes.

Detectors making use of the expansion law of bodies can only operate in accordance with a generally linear curve, so that for non-negligible temperature variations, there are very small variations in the value of the parameter used as the reference (length, volume or shape memory of materials).

Detectors using a phase change or shape memory material permit, e.g. by the release of a spring, relatively large displacements of a mobile member for a small temperature variation but, like the other detectors referred to hereinbefore, they are difficult to reuse after the threshold has been exceeded once.

The problem to which the invention provides a solution is that of supplying a temperature threshold exceeding detector, which is reusable and which can more specifically return to its initial state, provided that (a) the temperature has cleared the threshold in the reverse direction, i.e. has returned close to its initial value and (b) a specific voluntary operation has been carried out, which can be the operation of a key.

The detector according to the invention must emit an alarm signal as soon as the threshold has been exceeded and when the two aforementioned conditions are not simultaneously fulfilled. The term alarm signal is here understood to mean not only a sound, electric or optical signal, but also the signal constituted by the mechanical displacement of a part, e.g. constituting a bolt opposing the opening of a door without a special manipulation.

SUMMARY OF THE INVENTION

In order to obtain this result the invention provides a device for detecting the exceeding of a temperature threshold having a first part, which can move within a sealed chamber containing a temperature which melts or softens at the temperature of the threshold and a second part able to exert on the first part a magnetic force, at least when said first part is in a first position, so that a melting of said material leads to the displacement of the first part towards a second position.

This device has the special feature that the displacement of the first part during the melting of the material leads to a correlative displacement of the second part from a third to a fourth position, said displacement causing the actuation of alarm means and in the fourth position the second part exerts on the first part a magnetic force returning the first part to its initial position.

Advantageously, the first and second parts, when they are both in their initial position, exert magnetic forces on one another, the force being exerted on the second part immobilizing the latter in the third position by the combination of shapes with a fixed support. Moreover, when the first part passes into its second position, the magnetic force to which the second part has been subject decreases and enables said second part to pass into the fourth position under the effect of the elastic means and when the second part is in the fourth position, it exerts on the first part a magnetic force in the reverse direction, which tends to bring said first part into said first position.

It is clear that if, by a specific voluntary operation, the second part is moved towards the third position, two cases can occur. Thus, the material of the sealed chamber is still liquid and in this case the first part will pass again to its second position and it will be impossible to immobilize the second part, or the material has resolidified and in this case the first part remains in its first position and the device is rearmed in the manner of a multi-shot pistol.

Preferably, when the initial and second parts are in their first position, they exert magnetic repulsion forces on one another. Thus, in this case, the displacement of the first part towards the second position takes place with an initially intense force, which then decreases, which produces a tripping or release effect not occurring with attracting forces, which lead to a slow and therefore less precise starting.

According to a particularly interesting variant, the displacement of the second part towards the fourth position controls the exit of a bolt preventing the opening of a door, or the cover of an enclosure, a voluntary manipulation at the same time controlling the reinsertion of the bolt and the return of the second part to the third position.

Thus, a simple optical signal, such as the appearance of a warning light may not be noticed either as a result of poor visibility, or lack of attention, whereas the impossibility of opening the door or cover cannot pass unnoticed. Security can be further increased if it is necessary in this case to seek a key in a monitoring room for the purpose of opening the door.

Obviously, the device according to the invention can be used with other types of alarm means, which are either separate or combined with one another, whilst including among said means, those controlling the starting up of an emergency power supply.

According to a first embodiment, the first part can move in translation only along one axis and carries a magnetic pole on a face perpendicular to said axis, whilst the second part can move in translation parallel to said axis and also perpendicular thereto and carries two magnetic poles of opposite sign, on faces directed perpendicular to said axis, one of the poles facing the pole of the first part in the first position and the other pole in the second position.

According to a preferred embodiment, the first part can move in translation only along a first axis and carries a pair of magnetic poles of opposite signs on a face perpendicular to said axis and the second part can travel in translation along said axis and turn about said axis and carries a pair of poles of opposite signs on a face turned towards said face of the first part, a rotation of 180° of the second part bringing into a facing position the poles of the same sign of the two parts, or the poles of opposite signs, the magnetic force developed being adequate to rotate the second part about said axis and thus bring about the emission of an alarm signal.

It should be noted that the materials used for immobilizing the first part can be of the "clear-cut melting" type, such as solidified water, as well as of the "pasty melting" type, such as animal or vegetable fats or greases, certain organic acids and certain aqueous mixtures, including e.g. hydrocarbon derivatives, such as glycol. This pasty melting type has interesting solid phase blocking and pasty phase braking characteristics, which in the process of the invention make it possible to regulate the operating inertia of the detector.

BRIEF DESCRIPTION OF THE DRAWINGS

The invention is described in greater detail hereinafter relative to non-limitative embodiments and the attached drawings, wherein show.

DESCRIPTION OF THE INVENTION

In the drawings, similar parts carry the same references.

The detectors engaged with the interior of a cavity 1 of a freezer door 2, act on an alarm system integral with the control panel 3 located above the door and whereof an arrow F indicates the opening direction. The detector shown in FIGS. 1 and 2 comprises a cylindrical tube 4 sealed at its two ends and in tight form, within which can move over its entire length and along its axis an anisotropic permanent magnet 5 crimped within a tubular cylindrical skirt 6, said magnet constituting the said aforementioned "first part".

Figure 1:
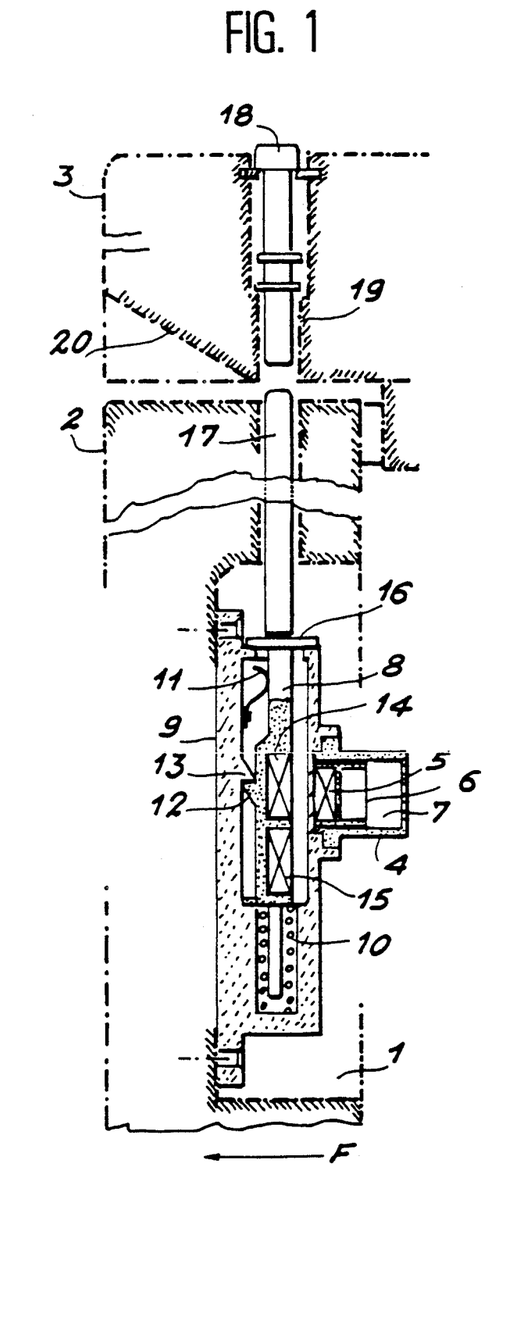
FIGS. 1 and 2 in longitudinal section the two possible positions of the parts of the device, respectively in the armed and released position, with action on the locking system of a freezer door.
Figure 2:
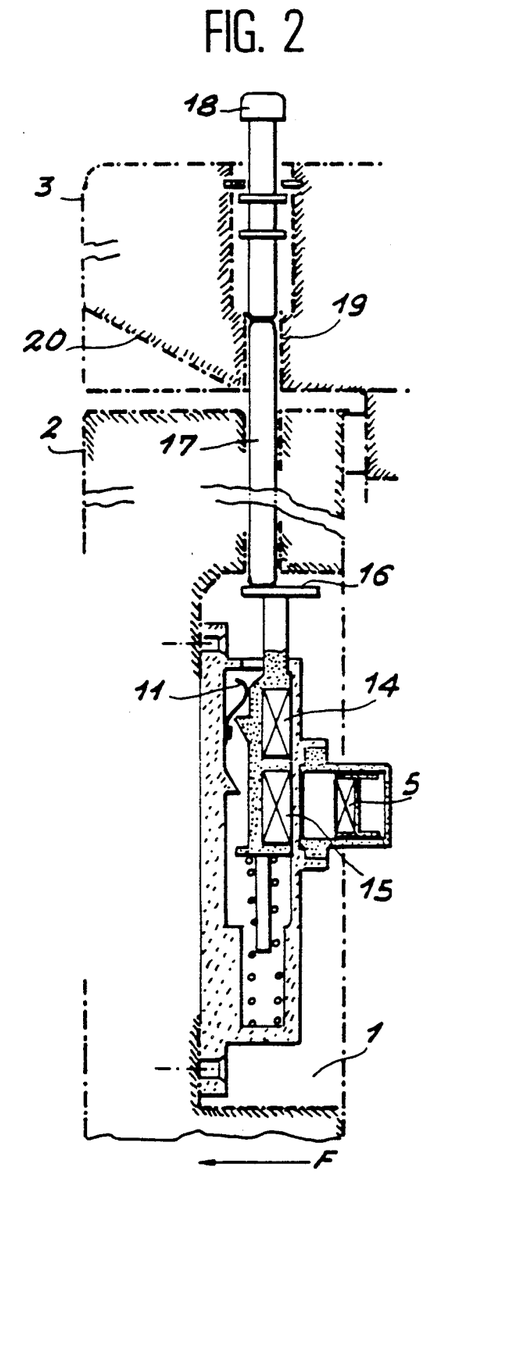

This assembly constitutes a "piston-cylinder" system containing a meltable substance 7 within which, as a result of a certain clearance, can move the magnet 5 with its skirt, which represents the piston.

Perpendicular to the axis of tube 4 is able to move, with a certain clearance, a sliding alarm control part 8 guided by a fixed case 9 and which forms the aforementioned "second part". This sliding part is subject to the action of two perpendicular forces, one developed by a spring 10, which tends to bring about its upward displacement in the longitudinal direction, i.e. perpendicular to the axis of tube 4 and the other developed by a spring 11, which tends to bring about its displacement towards tube 4 in the lateral direction, i.e. parallel to the axis of said tube.

In the drawings springs 10 and 11 are shown as a spiral spring or a plate spring. Obviously, these springs, like those referred to hereinbefore, can be magnetic springs.

The alarm control member 8 has a bevelled tooth 12 on a lateral face able to bear on an identical, but reversed tooth 13 integral with the fixed case 9.

The assembly constitutes a system of catches preventing the displacement, under the action of spring 10, of the mobile alarm control part 8, when the detector is in the armed position (FIG. 1). Part 8 has, mounted and bonded in two circular cavities located in the longitudinal axis of said part, but reciprocally displaced, two axial field, permanent anisotropic magnets 14, 15.

Magnet 14 is positioned in such a way that, when the detector is in the armed position (FIG. 1), it is placed precisely in the axis of the permanent magnet 5 located within tube 4, the polarity of the faces facing its two magnetic elements being of the same sign.

Magnet 15 is positioned in such a way that, when the detector is in the released position (FIG. 2), it is placed exactly in the axis of the permanent magnet 5 located within tube 4, the polarity of the facing faces of these two magnetic elements being of opposite signs.

The magnets 14 and 15 can be replaced by a single U-shaped magnet, whose two poles occupy the position of magnets 14 and 15.

The sliding part constituting the mobile alarm control part has, at the end opposite to spring 10, a planar boss 16 on which bears by gravity a sliding control rod 17 traversing the insulating material of the freezer door 2 and stops in the upper part thereof.

On the freezer control panel 3 and in the same sliding axis as rod 17 is mounted an alarm member 18, which slides within the fixed tube 19 traversing the control panel 3.

This system of sliding parts, one 17 ensuring a transmission function and the other 18 a reception function is designed in such a way that no contact is possible between the end of rod 17 and the end of part 18 facing the same when the detector is in the armed position (FIG. 1).

FIG. 2 illustrates the position of the different parts in the released or tripped position of the detector, where door 2 is locked by the control rod 17 entering tube 19 integral with the control panel and in which the alarm member 18 appears as a result of the same translation movement.

In order to unlock the door, by manual pressure action on member 18, it is merely necessary to again place it in the position shown in FIG. 1, whilst simultaneously actuating the door. It should be noted that when the door is open, the control rod 17 is again forced back by spring 10, which is compressed by the action of a ramp 20 integral with the control panel 3 and on which the end of control rod 17 bears during the door closing action.

Figure 3:
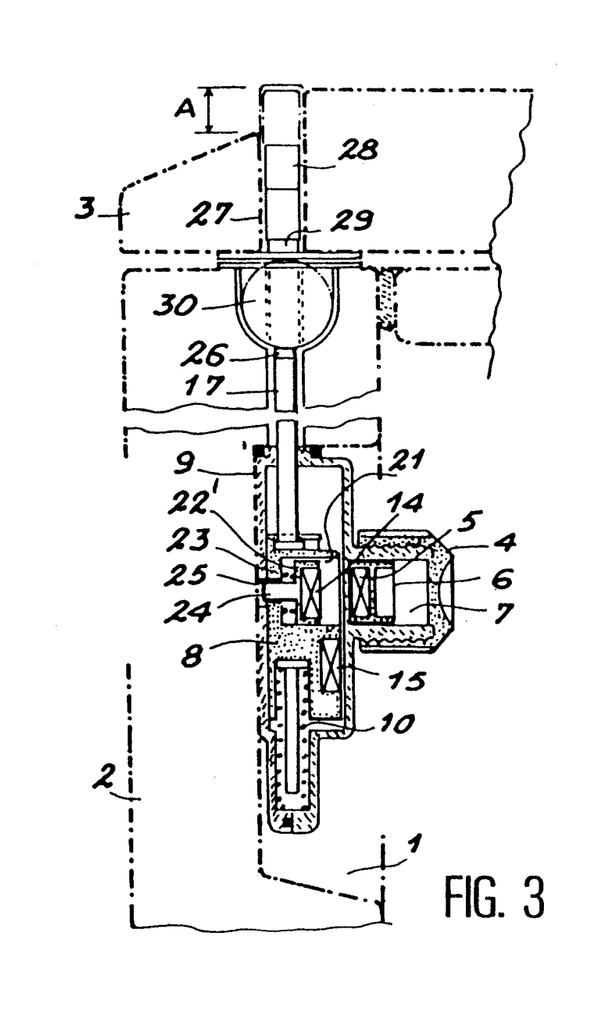
FIGS. 3 and 4 a constructional variant of the device in the armed position, respectively in longitudinal section and in front view with partial section.
Figure 4:
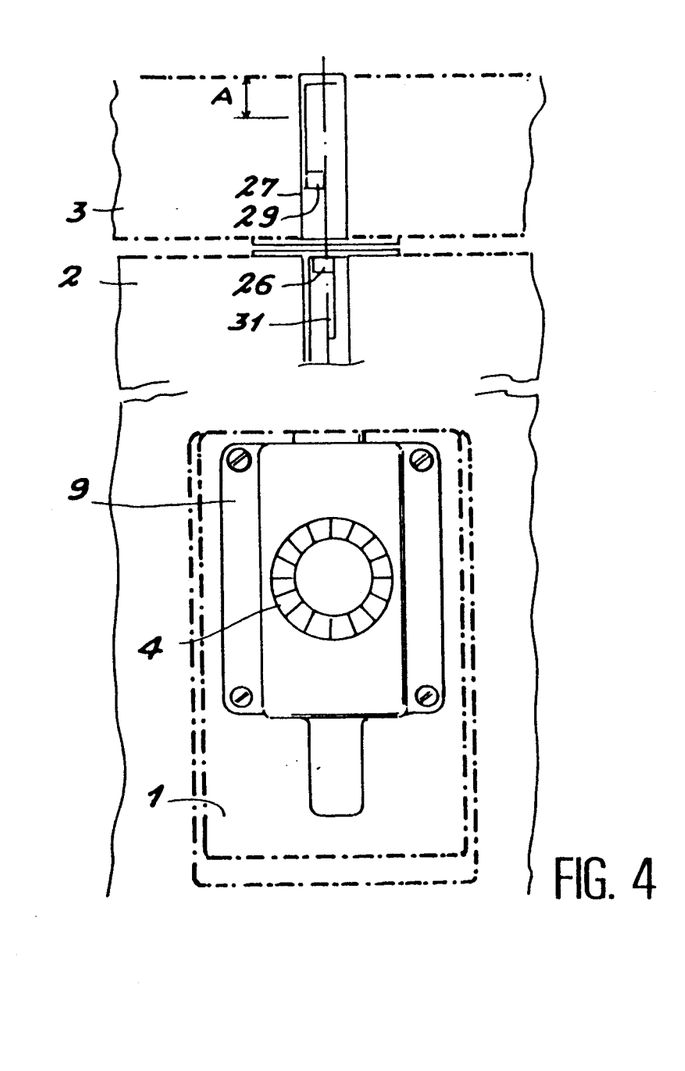

FIGS. 3 and 4 show in elevation and longitudinal section a variant of the detector. Its positioning and general structure remain unchanged.

It differs from that of FIGS. 1 and 2 as a result of the structure of the alarm control part 8 within which is formed a bore 21, whose axis is parallel to that of tube 4 and permits a cylindrical part 22' surrounding magnet 14 to slide towards tube 4 under the action of a spring 23 bearing on the bottom of bore 21 and in the opposite direction under the action of the magnet 5 located in the same axis, when the alarm control part is in the armed position. In this position, the end 24 of the cylindrical part 22' penetrates with a slight clearance a hole 25 made in case 9, the axis of the hole then being located precisely in the axis of said part.

The system described hereinbefore ensures the locking of the detector in the armed position and takes the place of the catch system described relative to FIGS. 1 and 2.

This embodiment also differs from that of FIGS. 1 and 2 by the fact that at its end the control rod 17 carries a cylindrical permanent magnet 26 oriented in accordance with the axis of the rod and which, at the end of translation, i.e. in the released position, occupies the top position illustrated in FIG. 4, i.e. it does not then oppose the opening of the door.

Along the same axis and within the control panel is located the optical alarm member. The latter comprises a fixed tube 27 and at least its upper end is transparent over a height A and within which freely slides a light tube 28 carrying in its upper part a ring having a fluorescent colour, whilst on the lower part of tube 28 is fastened an axial field, anisotropic permanent magnet 29.

The two axial field cylindrical magnets 26, 29 are mounted in such a way that their facing faces have the same polarity and their respective minimum air gap position leads, as a result of the interaction of the two magnets, to a repelling force forcing upwards the light tube 28 and enabling the fluorescent ring to appear over the entire height A of the transparent part of the fixed tube 25.

In the case of the tripping of the detector, rearming can be carried out by means of e.g. a coin 30, which is introduced into a slit 31 formed in door 2, in the extension of rod 17, in order to manually compress spring 10. The alarm control part 8 only maintains the armed position if the temperature of the freezer has become correct again, i.e. the substance 7 in tube 4 has returned to the solid state.

The variants shown in FIGS. 5 to 8 illustrates a detector based on an operating principle identical to the two other embodiments described hereinbefore, but in which for developing the attracting and repelling forces, use is made of bipolar permanent magnets, which are in the form of axial field orientation pellets.

Figure 5:
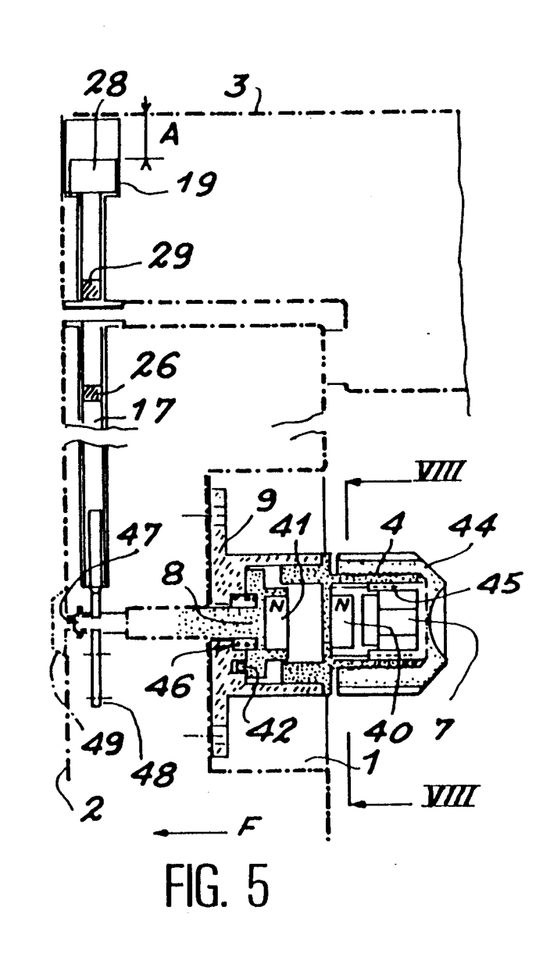
FIG. 5 a second variant of the device according to the invention in the armed position and longitudinal section.
Figure 6:
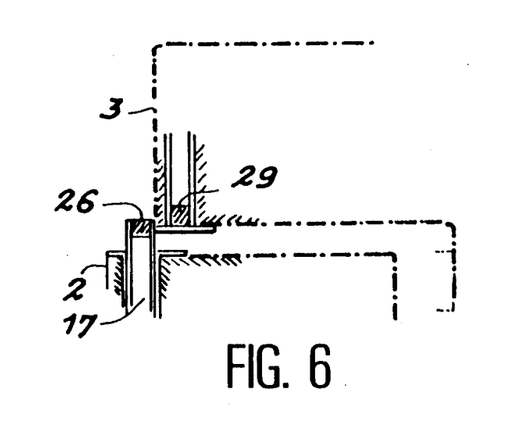
FIG. 6 in partial section, the device of FIG. 5 in the released or tripped position.
Figure 7:
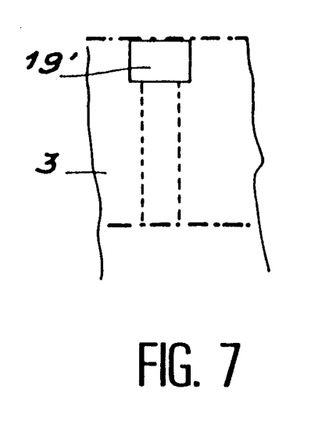
FIGS. 7 and 8 details, respectively in front view and half-section along line VIII—VIII, of the device of FIG. 5.
Figure 8:
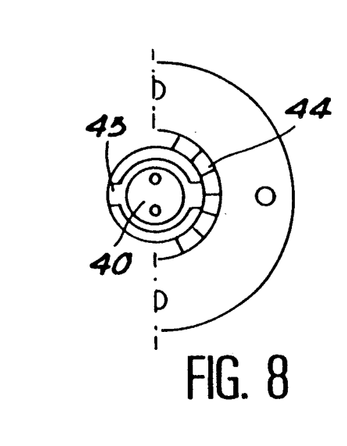

This makes it possible to obtain a rotary movement of the alarm control part by 180° instead of a sliding movement thereof and said movement is ensured by the torque developed when the two facing magnets located in the same axis present facing sectors with the same polarity.

Figure 13:
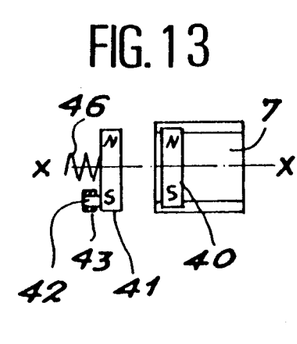
FIGS. 13 to 15 diagrams illustrating the operation of the device according to FIG. 5.
Figure 14:
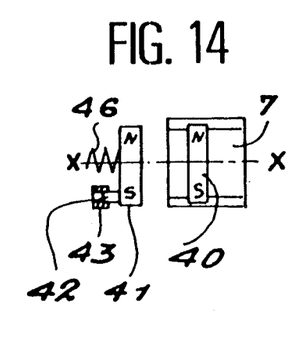
Figure 15:
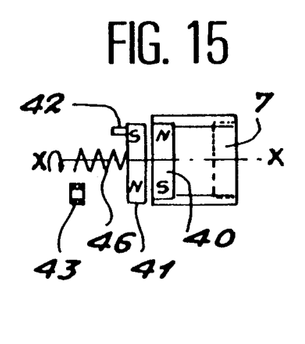

The diagrams of FIGS. 13 to 15 explain the different operating phases.

FIG. 13 shows the situation corresponding to the detector in the armed position, the bipolar magnets 40, 41 mounted on a same axis developing between them a repelling force. The only possible movement for magnet 40, which constitutes the first part referred to hereinbefore is a translatory movement along axis X—X. The solidified meltable substance 7 immobilizes magnet 40 in the indicated position, despite the repelling force developed by magnet 41 in the first position referred to hereinbefore.

FIG. 14 illustrates the phase corresponding to the start of melting of substance 7, which progressively frees the magnet 40, which makes it possible for the mobile alarm control part 8 carrying the magnet 41 to move towards the right under the action of a spring 46, along axis X—X, in order to reach the second position.

FIG. 15 illustrates the detector tripping phase. Melting continues and an immobilization lug 42 integral with the mobile alarm control part 8 is freed from a fixed cavity 43 and allows the potential energy accumulated by the interaction of the two magnets to be converted into kinetic energy, which ensures the rotary torque not only of magnet 41, but the entire alarm control part 8.

In this position, the two bipolar permanent magnets have their opposite polarity sectors facing one another, which leads to a magnetic attraction force on magnet 40, which corresponds to a translation of the latter to return it to its first position, i.e. to a correct position for a further solidification of the meltable substance.

FIG. 5 shows the construction of the variant illustrated by FIGS. 13 to 15.

The detector incorporates a cylindrical tube 4 sealed at its ends and externally provided with fins 44 and within which can axially move the bipolar anisotropic permanent magnet 40, surrounded by a skirt integral with two pins or keys 45 sliding in two slots machined within the finned tube. This mobile assembly constituted by the permanent magnet 40 and the skirt carrying the pins 45 prevents any rotary movement thereof, but permits a translation over the entire length and in the axis of tube 4.

Located in the same axis as tube 4, the mobile alarm control part 8 comprises, on the one hand the anisotropic bipolar magnet 41 in which it is crimped or bonded, and on the other hand the stop lug 42 preventing the rotation of the alarm control part 8 by penetrating a hole 43 made in the fixed case 9 mounted in door 2.

In order to prevent a dead point effect, lug 42 and hole 43 are arranged in such a way that in the armed position, the poles of magnet 41 are slightly displaced with respect to those of magnet 40. An angular displacement of approximately 3° is sufficient. An excessive displacement would lead to excessive friction of lug 42 against the wall of hole 43.

Case 9 is centrally provided with a first bore forming a bearing and ensuring the guidance of the mobile alarm control part, as well as a larger diameter second bore at the bottom of which bears the helical spring 46 and develops a force tending to free lug 42 from the hole 43 in case 9. The axial clearance of the mobile alarm control part within the case 9 slightly exceeds the length of lug 42.

The end 47 of the alarm control part 8 opposite to magnet 41 acts via a link 43 on the sliding rod 17 carrying at its end an anisotropic permanent magnet 26 able to interact with the magnet 29 integral with the optical alarm member 28. During the tripping of the detector, member 28 is positioned in front of a transparent window 19' (FIG. 7) formed in the upper part of the fixed tube 19 mounted in the control panel 3.

It should be noted that the sliding rod 17 projects from the upper part of the freezer door during the tripping of the detector (FIG. 6) and thereby prevents its closure. The latter is only possible by manual intervention on an arming control button 49 (in dotted line form) or by e.g. applying a manual force which, bearing on the end of the sliding rod 17, forces back the latter and thereby permits the closing of the door. The mobile alarm control part can only reassume the armed detector position if the temperature within the freezer is correct.

FIGS. 9 to 12 show the detail of a locking device according to the invention for a freezer door with the materialization of an optical alarm system. The device illustrates the transmission of a translatory movement ensured by the alarm control part of the detector applied to the interior of a cavity 1 of freezer door 2.

Figure 9:
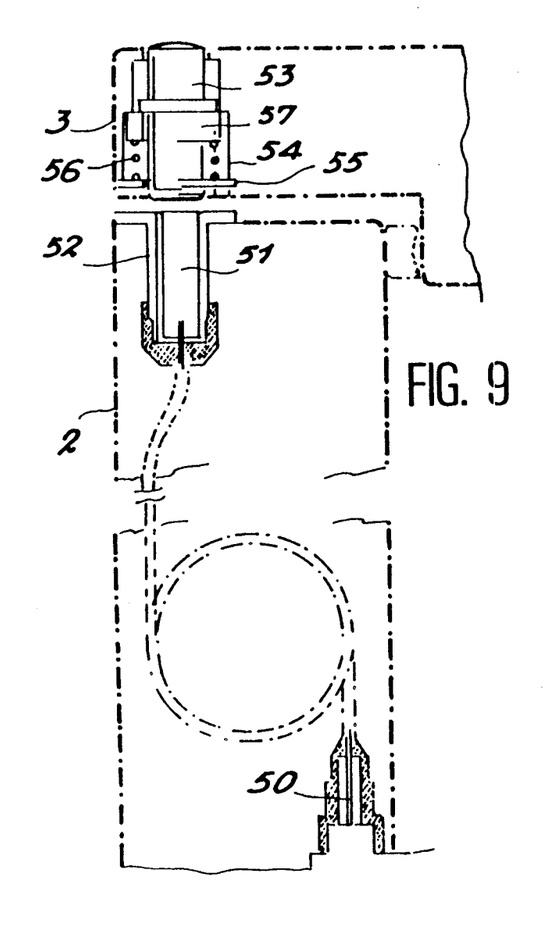
FIGS. 9 and 10 details of a freezer door locking device with movement transmission by flexible sheath.

A pliable, flexible steel wire 50, joined to the alarm control part of the detector by fitting and bonding, is able to faithfully transmit to the cylindrical part 51 sliding within tube 52 a displacement movement corresponding to the value of its own displacement.

In the same axis as the cylindrical part 51 and within the control panel 3 is fixed a rearming pushbutton 53 also ensuring the optical and tactile alarm. The latter is constituted by a tube 54 traversing the control panel and integral therewith and within which can slide the pushbutton 53 and having a height identical to the control panel thickness.

Within the tube 54 is fitted a circlip 55 on which bears a spring 56, which forces a cylindrical sliding part 57 back into the tube 54. Part 57 serves as an abutment and determines the bottom position of pushbutton 53, which is only subject to the action of gravity when the detector is in the armed position.

During the release of the detector (FIG. 10), the flexible steel wire 50 transmits the translatory movement of the alarm control part of the detector to the cylindrical part 51 which, on penetrating tube 54, forces back the pushbutton 53 and simultaneously ensures the locking of the door bringing about the appearance of the fluorescent coloured end of pushbutton 53 over a height A.

Figure 10:
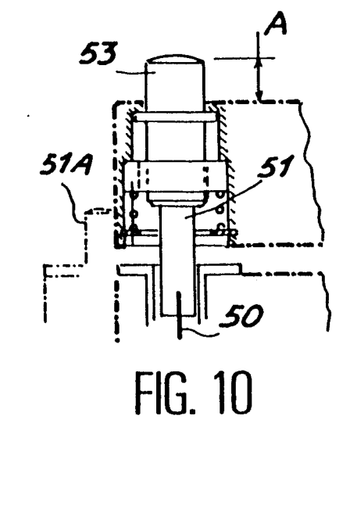

Door 2 is opened by manually pressing on pushbutton 53 which, forcing back the cylindrical part 51, moves aside the thus formed bolt and when the door is open the cylindrical part 51 reassumes the position indicated in dotted line form at 51A.

For closing the door, it is necessary to press manually on part 51 ensuring the displacement thereof by a value slightly exceeding the height A corresponding to the arming travel. The detector can only be armed if the temperature within the freezer has returned to a correct level.

Figure 11:
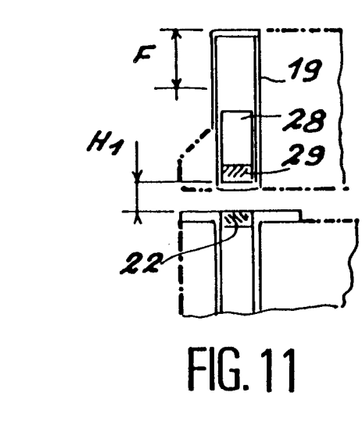
FIGS. 11 and 12 a magnetic alarm member using the repelling forces of two anisotropic magnetic elements.
Figure 12:
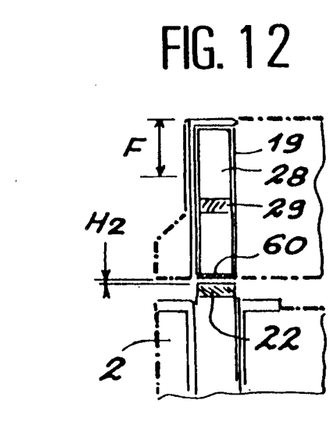

FIGS. 11 and 12 show a repulsion-attraction magnetic alarm member. The latter comprises a tube 19 traversing the control panel and which is transparent over a height F, within which can slide a light tube 28 having in its upper part a fluorescent ring and in its lower part a force-fitted, anisotropic permanent magnet 29. This alarm member is characterized in that a soft iron pellet 60 is fixed to the lower part of tube 19, e.g. by bonding. This makes it possible to produce an attracting force immobilizing the light tube 28 in the position indicated in FIG. 11 and corresponding to the armed detector position.

During release, the displacement of the permanent magnet 22 modifies the air gap, whose value passes from H1 to H2. The value of H2 is small, so that the presence of the soft iron pellet 60 ensures a sudden deformation of the magnetic field developed by magnets 22 and 29. The force lines are concentrated in the axis of the magnets forcing back the light tube 28 and ensuring the appearance of the fluorescent ring in front of the transparent window of tube 19.

It should be noted that the arrangement is such that, during release, the air gap decreases from H1 to H2. The arrangement could also be such that, during release, the air gap increases from H2 to H1, the value H2 representing the position corresponding to the armed detector and H1 that corresponding to the released detector. In this case the device can be identical to that described relative to FIGS. 1 and 2 or FIG. 3, spring 10 being replaced by a tension spring, magnets 14 and 15 being reversed and the locations of the complementary shapes of part 8 and fixed case 9 being modified, so that locking is normally obtained in the top position of part 8.

During the opening of the door, this reversed arrangement brings about the displacement by gravity alone of the light tube 28, magnet 29 no longer being subject to the repelling force of magnet 22.

Therefore the system acquires the new function of door opening indicator. In other words, the appearance of the fluorescent ring on the light tube 28 facing the transparent part of the fixed tube 19 (then located at the bottom of the latter) indicates either the tripping of the detector, or the opening of the door.

In a constructional variant of the magnetic alarm member, these two indications are obtained for two different positions of the light tube 28. The soft iron pellet 60 is then replaced by a mechanical stop or abutment.

Under the repulsion effect of magnets 22 and 29, said tube 28 occupies the top position illustrated in FIG. 12 when the detector is armed and the door closed. An indication of this state, carried on tube 28, then appears in front of the transparent window formed in the fixed tube 19.

During a tripping of the detector, the magnet 29 descends by a few millimetres, which leads to a comparable descent of the light tube 28. An indication of this state, also carried by tube 28, then appears in front of the window formed in the fixed tube 19.

Finally, the opening of door 2 has the effect of eliminating the alignment of magnets 22 and 29, so that the light tube 28 descends by gravity to a bottom position a few millimetres below the tripping position. A third indication carried by tube 28 then appears in front of the window formed in the fixed tube 10.

In the latter embodiment it should be noted that the total travel of magnet 29, which determines the travel of the light tube 28 between its top position (closed door, temperature below release threshold) and its intermediate position (door closed, temperature above release threshold) must by construction be relatively small (e.g. approximately 5 mm). However, the travel of part 8 can be much greater if the downward displacement by gravity of the rod 17 carrying magnet 26 is limited by means of an abutment formed in the fixed case 9.

The devices described hereinbefore can have numerous different applications, apart from the monitoring of a cold chamber. Thus, they can be used for detecting overheating of a furnace or boiler. The device can be used for detecting the clearing of a temperature threshold in the reverse direction. In this case, e.g. an auxiliary means periodically attempts to pass the device into the armed position from the tripped position and as a result of it reaching the latter the alarm is triggered.

We claim:

1. Device for detecting the clearing of a temperature threshold, incorporating a first part which can move within a sealed chamber containing a material which melts at the temperature of the threshold and a second part able to exert on said first part a magnetic force, at least when said first part is in a first position, so that a melting of said material leads to the displacement of said first part towards a second position, the displacement of said first part during the melting of the material leads to a correlative displacement of said second part from a third to a fourth position, said latter displacement bringing about the operation of alarm means, and said second part, in said fourth position, exerting on said first part a magnetic force bringing said first part into said first position.

2. Device as in claim 1, wherein said first and second parts, when both in their initial position, exert on one another magnetic forces, the force exerted on said second part immobilizing same in said third position by combination of shapes with a fixed support and when said first part passes into said second position, the magnetic force to which said second part is subject decreases and enables said second part to pass into said fourth position under the effect of elastic means and, when said second part is in said fourth position, it exerts on said first part a magnetic force in the reverse sense, which brings said first part back into said first position.

3. Device as in claim 2, wherein, when said first and second parts are in their initial position, they exert on one another magnetic repulsion forces.

4. Device as in claim 2, wherein the displacement of said second part towards said fourth position controls the exit of a bolt preventing the opening of a door, and pressure on said bolt controls the reinsertion of said bolt and the return of said second part to said third position.

5. Device as in claim 2, wherein the displacement of said second part controls, by magnetic repulsion, the displacement of an optical alarm member in a control panel.

6. Device as in claim 2, wherein said first part can move in translation only along one axis and carries a magnetic pole on a face perpendicular to said axis and said second part can move in translation parallel to said axis and also perpendicular thereto and carries two magnetic poles of opposite signs, on faces directed perpendicular to said axis, one of said two magnetic poles facing said pole of said first part in the first position and said other pole of said two magnetic poles carried by said second part facing said pole of said first part in said second position.

7. Device according to claim 2, wherein said first part can move in translation only along one axis (X—X) and carries a pair of magnetic poles of opposite signs on a face perpendicular to said axis and said second part can move in translation along said axis and rotate about said axis and carries a pair of poles of opposite signs on a face facing said face of said first part, the magnetic force developed when the poles of the same sign are in a facing position being sufficient to rotate said second part 180° about said axis to bring into a facing position the poles of opposite signs and thus bring about the actuation of the alarm means.

8. Device as in claim 1, wherein when said first and second parts are in their initial position, they exert on one another magnetic repulsion forces.

9. Device as in claim 8, wherein the displacement of said second part towards said fourth position controls the exit of a bolt preventing the opening of a door, and pressure on said bolt controls the reinsertion of said bolt and the return of said second part to said third position.

10. Device as in claim 8, wherein the displacement of said second part controls, by magnetic repulsion, the displacement of an optical alarm member mounted in a control panel.

11. Device according to claim 8, wherein said first part can move in translation only along one axis and carries a magnetic pole on a face perpendicular to said axis and said second part can move in translation parallel to said axis and also perpendicular thereto and carries two magnetic poles of opposite signs, on faces directed perpendicular to said axis, one of said two magnetic poles facing said pole of said first part in the first position and said other pole of said two magnetic poles carried by said second part facing said pole of said first part in said second position.

12. Device according to claim 8, where said first part can move in translation only along one axis (X—X) and carries a pair of magnetic poles of opposite signs on a face perpendicular to said axis and said second part can move in translation along said axis and rotate about said axis and carries a pair of poles of opposite signs on a face facing said face of said first part, the magnetic force developed when the poles of the same sign are in a facing position being sufficient to rotate said second part 180° about said axis to bring into a facing position the poles of opposite signs and thus bring about the actuation of the alarm means.

13. Device as in claim 1, wherein the displacement of said second part towards said fourth position controls the exit of a bolt preventing the opening of a door, and pressure on said bolt controls the reinsertion of said bolt and the return of said second part to said third position.

14. Device according to claim 13, wherein said first part can move in translation only along one axis and carries a magnetic pole on a face perpendicular to said axis and said second part can move in translation parallel to said axis and also perpendicular thereto and carries two magnetic poles of opposite signs, on faces directed perpendicular to said axis, one of said two magnetic poles facing said pole of said first part in the first position and said other pole of said two magnetic poles carried by said second part facing said pole of said first part in said second position.

15. Device as in claim 1, wherein the displacement of said second part controls, by magnetic repulsion, the displacement of an optical alarm member mounted in a control panel.

16. Device as in claim 15, wherein the displacement of said second part from said third to said fourth position controls an upward displacement of the optical alarm member in opposition to gravity.

17. Device as in claim 15, wherein the displacement of said second part from said third to said fourth position, as well as the opening of a door controls a downward displacement of the optical alarm member.

18. Device as in claim 17, wherein the displacement of said second part from said third to said fourth position controls a displacement of the optical alarm member for a first distance and the opening of said door controls a displacement of said optical alarm member for a second distance greater than said first distance.

19. Device as in claim 1, wherein said first part can move in translation only along one axis and carries a magnetic pole on a face perpendicular to said axis and said second part can move in translation parallel to said axis and also perpendicular thereto and carries two magnetic poles of opposite signs, on faces directed perpendicular to said axis, one of said two magnetic poles facing said pole of said first part in the first position and said other pole of said two magnetic poles carried by said second part facing said pole of said first part in said second position.

20. Device as in claim 1, wherein said first part can move in translation only along one axis (X—X) and carries a pair of magnetic poles of opposite signs on a face perpendicular to said axis and said second part can move in translation along said axis and rotate about said axis and carries a pair of poles of opposite signs on a face facing said face of said first part, the magnetic force developed when the poles of the same sign are in a facing position being sufficient to rotate said second part 180° about said axis to bring into a facing position the poles of opposite signs and thus bring about the actuation of the alarm means.

* * * * *